United States Patent [19]

Volk, Jr.

[11] Patent Number: 4,700,310
[45] Date of Patent: Oct. 13, 1987

[54] AUTOMATIC PELLET MILL CONTROLLER WITH STEAM TEMPERATURE CONTROL

[75] Inventor: Joseph A. Volk, Jr., Creve Coeur, Mo.

[73] Assignee: Beta Raven Inc., Earth City, Mo.

[21] Appl. No.: 848,219

[22] Filed: Apr. 4, 1986

Related U.S. Application Data

[63] Continuation-in-part of Ser. No. 813,244, Dec. 24, 1985.

[51] Int. Cl.⁴ .............................................. G06F 15/46
[52] U.S. Cl. ...................................... 364/468; 99/487; 364/172; 364/557; 426/454
[58] Field of Search ............... 364/468, 469, 476, 477, 364/557, 172, 173; 137/2, 3; 99/486-488; 425/DIG. 230, 331; 426/454, 231, 512, 630, 635, 636; 241/34, 35

[56] References Cited

U.S. PATENT DOCUMENTS

| | | | |
|---|---|---|---|
| 3,932,736 | 1/1976 | Zarow et al. | 99/487 X |
| 3,978,244 | 8/1976 | Sair | 426/634 X |
| 4,022,915 | 5/1977 | Zukerman | 426/72 |
| 4,119,742 | 10/1978 | Stupec | 426/641 |
| 4,152,465 | 5/1979 | Kiuima et al. | 426/455 |
| 4,211,071 | 7/1980 | Wyatt | 60/39.55 |
| 4,288,978 | 9/1981 | Wyatt | 60/39.05 |
| 4,337,619 | 7/1982 | Wyatt | 60/39.55 |
| 4,340,937 | 7/1982 | Volk, Jr. | 364/173 X |
| 4,418,651 | 12/1983 | Wyatt | 122/31 R |
| 4,424,016 | 1/1984 | Matsuda et al. | 425/145 X |
| 4,441,460 | 4/1984 | Wyatt | 122/31 R |
| 4,463,430 | 7/1984 | Volk, Jr. et al. | 364/181 X |

Primary Examiner—Joseph Ruggiero
Attorney, Agent, or Firm—Rogers, Howell, Moore & Haferkamp

[57] ABSTRACT

An automatic pellet mill controller controls a vapor steam generator for use with the pellet mill, the vapor steam generator having the capability of producing steam at a constant pressure but with a variable temperature to suit the particular ambient conditions, or formulation of feed being pelleted, or temperature at any point in the pellet mill. After the steam temperature is selected, the control can operate in any one of the various control modes which control the automatic pelleting of the pellet mill for the particular feed formulation.

30 Claims, 2 Drawing Figures

4,700,310

AUTOMATIC PELLET MILL CONTROLLER WITH STEAM TEMPERATURE CONTROL

BACKGROUND AND SUMMARY OF THE INVENTION

This is a continuation-in-part of Ser. No. 06/813,244 filed Dec. 24, 1985.

The inventor herein has previously designed and developed automatic controls for pellet mills which automatically control the process of converting dry material and various kinds of moisture including steam, water, and molasses or the like into pellets of homogenous composition as is desired in the feed industry, and in other industries as well. These automatic controllers are disclosed and claimed in his prior patents including U.S. Pat. Nos. 3,932,736, 4,340,937, and 4,463,430, the disclosures of which are incorporated herein by reference, along with the other pending application mentioned above. Each of the devices disclosed provide still further developments and enhancements of the automatic control and improve upon or provide alternative control modes.

One of the factors which must be dealt with in automatically controlling a pellet mill is the relationship between temperature and moisture as evidenced by the addition of steam to the material to form a mash prior to its introduction into the mill where it is squeezed by a roller through a die to form the pellet. As is known in the art, a pellet mill installation is generally in an environment with an uncontrolled temperature such that the material approaches ambient temperature which can vary with the seasons through a very significant temperature differential. The inventor's previously patented control systems minimize or eliminate the effects of ambient temperature by using a temperature differential sensed across a portion of the pelleting apparatus as the material traverses the apparatus. However, as the principal means of adding temperature in most installations is through the addition of steam, the addition of steam also adds moisture and in some formulations or under some conditions moisture may not be desired. Thus, in some installations the addition of dry heat is either desirable or necessary to achieve optimal pelleting, and this is typically accomplished through the use of a steam jacket which encloses a portion of the pellet apparatus and elevates the temperature of the material as it traverses that portion of the apparatus through the radiation of heat from the side walls of the steam jacket. As is well known in the art, these steam jackets can be expensive, require maintenance, and are not the most efficient use of steam in that the heat transfer efficiency is low, the moisture content of the steam is lost, and its use increases the demand on a boiler system.

Recently, an improved steam generating system has been made commercially available which can convert water to steam on a continuous flow basis, and even more significantly, generate superheated steam at a constant pressure of between 4 to 6 PSI and an adjustable temperature of between 194° F. to 600° F. As the moisture content of the steam is directly related to the pressure, this device can provide a continuous supply of steam having a fixed moisture content but at a variable temperature. The typical boiler system of the prior art generates steam at a single temperature and pressure, or varies the pressure at the same time that the temperature of the steam is changed, thereby altering the moisture content of the steam as the temperature of the steam is changed. With this new direct fired steam generator, the heat content of the steam can be directly controlled by the automatic pellet mill controller which virtually eliminates the requirement for steam jackets or other sources of dry heat.

For example, in some control modes, it is desired to maintain the moisture content of the material in the pelleting apparatus to within a prescribed range. Assuming the rate of flow of dry material into the pellet mill can be determined and controlled, the rate of flow of moisture can be controlled accordingly by controlling the rate of flow of steam at a constant pressure of between 4 to 6 PSI with this new steam generator. However, as temperature also plays an important part in the pelleting process, with the same flow of material, and the same flow of moisture, a different steam temperature may be desired on cold winter days than that which is desired on hot summer days. Thus, the steam temperature could ideally be adjusted to account for these changes in ambient conditions. By way of further example, there are some formulations in which a greater temperature addition may be required or desired to achieve optimal pelleting. For these formulations, it may be desired to control the moisture content of the material, but it also may be desired to elevate the temperature over that which would ordinarily be provided by a standard boiler system. For those formulations, it would be desirable for an operator to be able to dial in the desired steam temperature and to have the controller automatically control the moisture content of the material by controlling the rate of flow of steam.

In still another control mode, the amount of moisture added to the material can be controlled in response to either the temperature of the die itself, or the difference in temperature between the die and the material at the spout of the mill. In these control modes, the steam temperature could be controlled in response to the temperature of the die or the temperature of the material at the spout. The present invention represents a significant improvement to the inventor's prior work in automatic pelleting controls as it takes full advantage of the adjustability of steam temperature in the pelleting process as is available with this new steam generator.

While the foregoing has been a brief description of the principal advantages and features of the present invention, a fuller understanding thereof may be gained by referring to the drawings and description of the preferred embodiment which follows.

DETAILED DESCRIPTION OF THE PREFERRED EMBODIMENT

Figure 1:
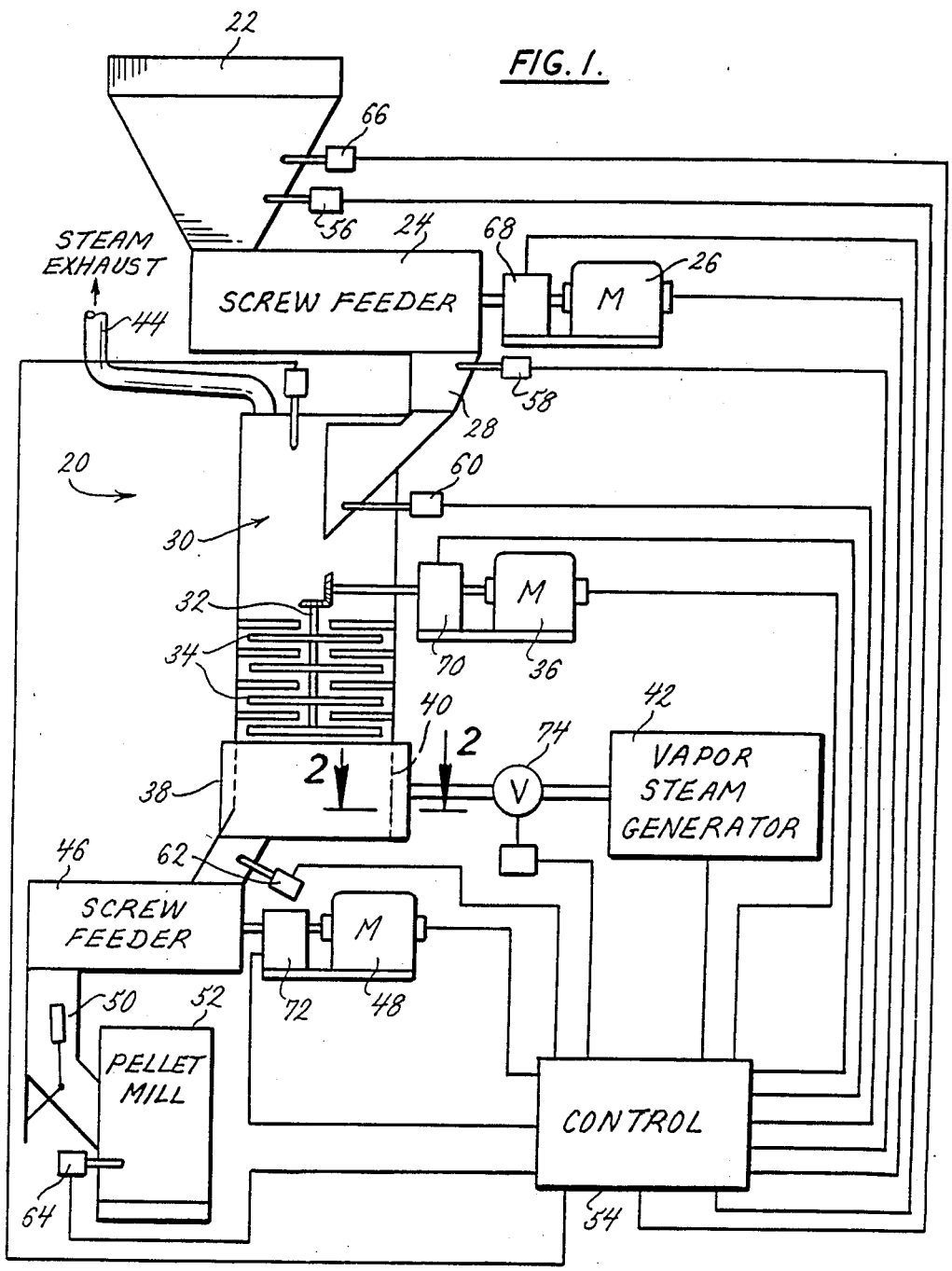
FIG. 1 is a diagramatic representation of a pellet mill with an improved control of the present invention.
Figure 2:
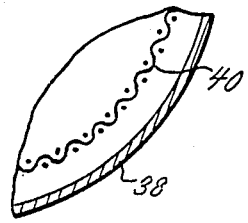
FIG. 2 is a partial cross-sectional view taken along the plane of line 2—2 in FIG. 1 and detailing the jacketed screened wall for introducing the steam into the conditioner.

As shown in FIG. 1, a typical pellet mill 20 includes an input bin for dry feed 22 which feeds dry material through a screw feeder 24 driven by motor 26 through a chute or spout 28 into a vertical conditioner 30, vertical conditioner 30 having a vertically mounted drive shaft 32 with paddles 34 as driven by drive motor 36. A mixing enclosure 38 surrounds the lower end of vertical conditioner 30 and has a screen 40 (as best shown in FIG. 2) separating the feed from an annular space into which steam is introduced from the vapor steam generator 42. As can be appreciated, once steam from steam generator 42 is introduced into mixing chamber 38 it mixes with material and rises through the vertical conditioner 30, with excess steam exiting steam exhaust 44. Another screw feeder 46 is driven by motor 48 to transport the mixture of mash from the vertical conditioner through chute 50 into the pellet mill 52.

The pellet mill controller 54 has connections to a bin temperature sensor 56, a temperature sensor 58 which senses the temperature of the material prior to its entering vertical conditioner 30, temperature sensor 62 which senses the temperature of the mash mixture after exiting the vertical conditioner 30, and temperature sensor 64 which can be positioned to sense the temperature of the material after it is pelleted, or to sense the temperature of the die (not shown), or the pellets as they are immediately formed by the die, as shown in the parent application mentioned above. For purposes of clarity, only a single temperature sensor 64 is shown. However, it is to be understood that a temperature sensor can be positioned as desired to sense the temperature of any of the above. In addition to temperature sensors, the control 54 has a bin level sensor 66 which senses the level of material in the bin 22, and feedback signals from tachometers 68, 70, and 72 to sense the speed of the various motors positioned throughout the mill 20, all as known in the art. Steam flow can be controlled through a valve 74, and the variable temperature of the steam can be controlled by controlling the vapor steam generator 42.

In operation, one or more of the temperature sensors can be used by the control to set the temperature of steam which is desirably input into the pelleting apparatus. Such an example may be an ambient temperature sensor, a dry material or bin temperature sensor, a temperature sensor at the spout of the mill, an operator input such as would typically be found on a face panel of a control, or the die temperature as sensed by a non-contacting temperature sensor. Once the steam temperature is set, then the pellet mill control can control the pellet mill in any one or more of the control modes as is disclosed in any of the inventor's prior patents, or pending patent application which are incorporated herein by reference.

There are various changes and modifications which may be made to the invention as would be apparent to those skilled in the art. However, these changes or modifications are included in the teaching of the disclosure, and it is intended that the invention be limited only by the scope of the claims appended hereto.

I claim:

1. An automatic control system for a pelleting apparatus, the apparatus including a pellet producing means, means for feeding a supply of material to the producing means, means for producing a supply of steam, said steam producing means including means to adjust the superheated temperature of the steam, and means for feeding said steam to the producing means, the control system including means to control the steam producing means to select a desired superheated temperature of the steam.

2. The system of claim 1 further comprising a first means for sensing the temperature of a predetermined parameter and wherein the steam producing control means includes means to adjust the steam temperature in response to the first temperature sensing means.

3. The system of claim 2 wherein the steam producing means has means to adjust the superheated temperature of the steam without changing the moisture content of the steam.

4. The system of claim 3 wherein the control system further comprises means to control the moisture content of the material at the producing means to within a prescribed range.

5. The system of claim 3 wherein the pellet producing means includes a die, the first temperature sensing means having means to sense the temperature of the die.

6. The system of claim 3 further comprising a plurality of temperature sensing means for sensing the temperature of the material at a plurality of locations in the pelleting apparatus, and means to control the input of at least the steam in response to at least two of said temperature sensing means.

7. The system of claim 6 wherein said at least two temperature sensing means are located at the input and output of the pellet producing means.

8. The system of claim 6 wherein the pelleting apparatus further comprises means to mix the material and steam, said at least two temperature sensing means being located at the input and output of said mixing means.

9. The system of claim 6 wherein the pellet producing means includes a die, said at least two temperature sensing means having means to sense the temperature of the material prior to entering the pellet producing means and the temperature of the die.

10. The system of claim 3 wherein the pellet producing means includes a die, said die having means to form pellets, and further comprising means to sense the temperature of the die, and means to control the input of at least the steam in response to said die temperature sensing means.

11. The system of claim 3 wherein the pellet producing means includes a die, said die having means to form pellets, and further comprising means to sense the temperature of the pellets immediately as they are formed by the die, and means to control the input of at least the steam in response to the pellet temperature sensing means.

12. The system of claim 6 further comprising means to select said at least two temperature sensing means from the plurality of said temperature sensing means.

13. An automatic control system for a pelleting apparatus, the apparatus including a pellet producing means, means for feeding a supply of material to the producing means, means for producing a supply of steam, said steam producing means including means to adjust the superheated temperature of the steam, and means for feeding said steam to the producing means, the control system including means for sensing the ambient temperature, and means to control the steam producing means at least partially in response to said ambient temperature sensing means.

14. The system of claim 13 wherein the steam producing control means includes means to adjust the steam temperature in response to the ambient temperature sensing means.

15. The system of claim 14 wherein the steam producing means has means to adjust the superheated temperature of the steam without changing the moisture content of the steam.

16. The system of claim 15 wherein the control system further comprises means to control the moisture content of the material at the producing means to within a prescribed range.

17. The system of claim 15 further comprising a plurality of temperature sensing means for sensing the temperature of the material at a plurality of locations in the pelleting apparatus, and means to control the input of at least the steam in response to at least two of said temperature sensing means.

18. An automatic control system for a pelleting apparatus, the pelleting apparatus including a pellet producing means, means for feeding a supply of material to the producing means, means for feeding a supply of moisture to the producing means including means to produce a supply of steam, said steam producing means having means to adjust the heat content of the steam without changing the moisture content, the control means including means to determine the desired amount of moisture to be added to the mixture, means to determine the desired amount of heat to be added to the mixture, and means to control the moisture supply means to add the desired amounts of heat and moisture to the material.

19. The system of claim 18 wherein the means to determine the desired heat comprises a temperature sensing means.

20. The system of claim 19 wherein the means to determine the desired moisture comprises means to sense a temperature differential of the material as it traverses the pelleting apparatus.

21. The system of claim 20 wherein the temperature differential is taken across the pellet producing means.

22. The system of claim 20 wherein the producing means includes means to mix the moisture and material, and wherein the temperature differential is taken across the mixing means.

23. The system of claim 18 wherein the means to determine the desired heat comprises a temperature sensing means, said temperature sensing means having means to sense the temperature of the material.

24. The system of claim 23 wherein the temperature sensing means senses the temperature of the material prior to being fed to the pellet producing means.

25. The system of claim 18 wherein the control means has means to permit operator selection of the desired amount of heat.

26. The system of claim 18 wherein the means to determine the desired amount of moisture comprises at least one temperature sensing means.

27. The system of claim 18 wherein the pellet producing means further comprises a die, said die having means to form pellets, and further comprising means to sense the temperature of the die, the moisture determining means being at least partially responsive to the die temperature sensing means.

28. The system of claim 18 wherein the pellet producing means further comprises a die, said die having means to form pellets, and further comprising means to sense the temperature of the pellets immediately as they are formed by the die, the moisture determining means being at least partially responsive to the pellet temperature sensing means.

29. The system of claim 18 wherein the pellet producing means includes a die, and means to mix the material and moisture, and wherein the control further comprises means to sense the temperature of the material prior to entering the die and means to sense the temperature of the die, the moisture determining means being at least partially responsive to the difference in temperature as sensed by the two temperature sensing means, and the heat determining means being at least partially responsive to the die temperature.

30. The system of claim 18 wherein the means to determine the desired heat comprises a temperature sensing means for sensing the temperature of the material prior to being fed to the pellet producing means, and wherein the means to determine the desired moisture comprises means to sense the temperature differential of the material as it traverses the pellet producing means.

* * * * *